United States Patent [19]

Frederick et al.

[11] Patent Number: 5,625,724
[45] Date of Patent: Apr. 29, 1997

[54] FIBER OPTIC HYDROPHONE HAVING RIGID MANDREL

[75] Inventors: Donald A. Frederick, Woodland Hills; John F. Cappi, Reseda, both of Calif.

[73] Assignee: Litton Systems, Inc, Woodland Hills, Calif.

[21] Appl. No.: 611,803

[22] Filed: Mar. 6, 1996

[51] Int. Cl.$^6$ .............. G02B 6/00; G01B 9/02; H04B 13/00
[52] U.S. Cl. .............. 385/12; 385/13; 385/100; 385/115; 385/116; 385/123; 250/227.11; 250/227.14; 250/227.19; 356/345; 356/350; 367/149
[58] Field of Search .............. 385/12, 13, 100, 385/115, 116, 14, 123; 250/227.11, 227.4, 227.19; 356/345, 350; 367/149

[56] References Cited

U.S. PATENT DOCUMENTS

| 4,525,818 | 7/1985 | Cielo et al. ............ 367/149 |
| 4,799,752 | 1/1989 | Carome ............ 367/149 |
| 5,253,222 | 10/1993 | Danver et al. ............ 367/149 |
| 5,285,424 | 2/1994 | Meyer ............ 367/149 |
| 5,317,544 | 5/1994 | Maas et al. ............ 367/149 |
| 5,363,342 | 11/1994 | Layton et al. ............ 367/149 |
| 5,394,377 | 2/1995 | vonBieren ............ 367/149 |
| 5,475,216 | 12/1995 | Danver et al. ............ 250/227.14 |
| 5,504,720 | 4/1996 | Meyer et al. ............ 367/149 |

FOREIGN PATENT DOCUMENTS 2146447  4/1985  United Kingdom .............. 385/12 X

*Primary Examiner*—Brian Healy
*Attorney, Agent, or Firm*—Lynn & Lynn

[57] ABSTRACT

A fiber optic interferometric sensor for use in a hydrophone system at high pressures includes a reference fiber wrapped around a rigid inner cylinder. A solid layer of compliant material is applied over the reference fiber. The sensing arm of the interferometer is wound over the layer of material applied over the reference fiber. The outer material is sufficiently compliant to provide acoustic sensitivity comparable to that of air-backed hydrophones.

3 Claims, 2 Drawing Sheets

FIBER OPTIC HYDROPHONE HAVING RIGID MANDREL

BACKGROUND OF THE INVENTION

This invention relates generally to fiber optic hydrophones and particularly to a solid interferometric fiber optic hydrophone. Still more particularly, this invention relates to a solid interferometric fiber optic hydrophone that is suitable for operation at high pressures with high, linear acoustic sensitivity and low sensitivity to linear acceleration.

Heretofore, fiber optic hydrophones have comprised two concentric hollow mandrels, each wrapped with a length of optical fiber that forms one leg of an optical interferometer. The outer mandrel typically is thin-walled so that its radius changes in response to incident acoustic pressure. A sealed air cavity is formed between the two mandrels. The inner mandrel is typically either thin-walled, with its interior exposed to the ambient pressure so that its radius would change in the opposite sense from that of the outer mandrel under acoustic pressure "push-pull" configuration), or relatively thick-walled, and possibly filled with a solid potting compound to serve as a "reference arm" for the interferometer.

The thin sensing shells backed by an air cavity are very compliant and provide a sensitive hydrophone. The cylindrical shape provides for a low net change in fiber length (i.e. low sensitivity) due to linear accelerations, which is desirable in a hydrophone. The ability to survive submersion to great depth must be provided by ensuring that the outer shell is thick enough to resist being crushed by the water pressure.

This depth survival requirement limits the compliance that the mandrel can exhibit in response to acoustic signals. Hence, with the prior art hydrophone technology it is difficult to deploy a sensitive hydrophone in an array that must survive at depth.

Production of these hydrophones is also time consuming and costly because the air cavity between the two mandrels must be sealed. This seal must allow for passage of fiber through it to the outside of the inner mandrel. This is a delicate assembly process, and leaking and fiber breakage at this seal is not an uncommon failure mechanism of these instruments.

The air cavity can also support acoustic resonances. The relatively low speed of sound in air and the high damping of acoustic waves in the air cavity can cooperate to establish these resonances within the acoustic detection bandwidth. This limits the frequency range of linear operation of the hydrophone, and can be problematic in some hydrophone designs.

SUMMARY OF THE INVENTION

The present invention uses an interferometric arrangement of the signals guided by sensing and reference fibers. A reference fiber is wrapped around a rigid inner cylinder. Instead of sensing with an air-backed outer shell, as in the prior art, a solid layer of compliant material is applied over the reference fiber. The sensing arm of the interferometer is wound over the layer of material applied over the reference fiber. The outer material is sufficiently compliant to provide acoustic sensitivity comparable to that of air-backed hydrophones. The present invention provides greater sensitivity than that of air-backed designs intended for operation at great depth. The cylindrical shape is retained, and so the present invention has excellent resistance to acceleration sensitivity.

Unlike prior art fiber optic hydrophones, the present invention does not cause concern about being crushed under high pressure. Assembly of the device is greatly simplified by not having to seal an air cavity with a fiber feedthrough. The cost of the device is also lowered by simplifying the design of its pieces and increasing the yield of the assembly process. Reliability should increase with diminished probability of the devices springing leaks in the usage. The solid composition of the device is also expected to prevent any acoustic resonance activity over quite a broad range of acoustic frequencies.

An interferometric fiber optic hydrophone according to the invention comprises a rigid mandrel. A fiber optic interferometer having a sensing arm, a reference arm are formed on the rigid mandrel. The interferometer includes apparatus for processing optical signals output from the fiber optic interferometer to measure acoustic pressure. The reference arm comprises a length of optical fiber wound around the rigid mandrel arranged to have a substantially constant optical path length when the fiber optic hydrophone is exposed to an acoustic field. The sensing arm comprises a length of optical fiber formed as a coil and arranged to undergo an optical path length change when the fiber optic hydrophone is exposed to an acoustic field.

The fiber optic hydrophone according to the invention preferably further includes an elastic material placed over the reference arm, and the sensing arm is coil wound over the elastic material such that the sensing arm and reference arm are concentric. The elastic material may comprises urethane or other similar material.

The sensing arm coil may be encased in an elastic material and spaced apart from the reference arm instead of being concentric as is conventional.

An appreciation of the objectives of the present invention and a more complete understanding of its structure and method of operation may be had by studying the following description of the preferred embodiment and by referring to the accompanying drawings.

DESCRIPTION OF THE PREFERRED EMBODIMENT

Figure 1:
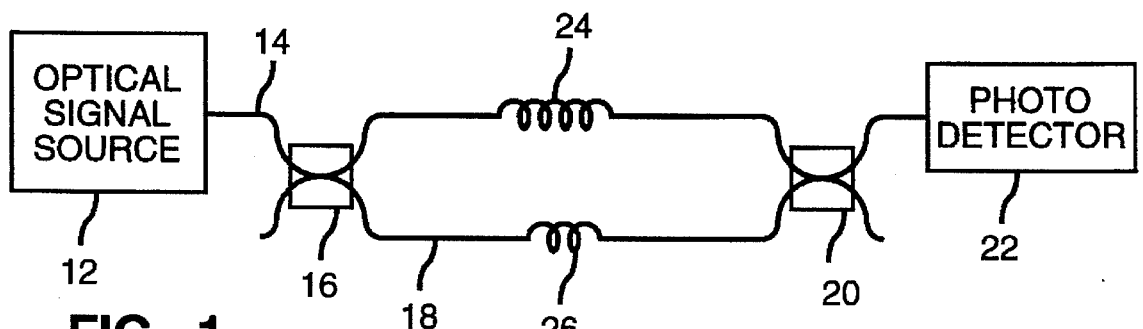
FIG. 1 illustrates a Mach-Zehnder interferometer structure that may be used for sensing changes in acoustic pressure.

FIG. 1 illustrates a basic structure for a fiber optic Mach-Zehnder interferometer 10 that may be used in forming a solid fiber optic hydrophone according to the invention. The invention may be practiced using any type of fiber optic interferometer and is not limited to the particular structure shown in FIG. 1.

An optical signal source 12 provides an optical signal input to an optical fiber 14 that then guides the optical signal to a fiber optic coupler 16. The fiber optic coupler includes the optical fiber 14 and a second optical fiber 18 arranged so that a portion of the optical signal guided to the fiber optic coupler 16 via the optical fiber 14 is coupled into the optical fiber 18. The optical fibers 14 and 18 guide optical signals to a second fiber optic coupler 20 where a portion of the optical signal guided by the optical fiber 18 is coupled into the optical fiber 14. The combination of the optical signals that have propagated along the optical fibers 14 and 18 produces an interference pattern. The combined optical signals are directed to a photodetector 22, which produces electrical signals indicative of the optical intensity in the interference pattern.

In the Mach-Zehnder interferometer 10, the portions of the optical fibers 14 and 18 that are between the fiber optic couplers 16 and 20 will be referred to as the sensing arm 24 and the reference arm 26, respectively. When the sensing arm is exposed to an acoustic field, changes in the field produce changes in the optical path length of the sensing arm 24. Any change in the optical path difference between the sensing are 24 and the reference arm 26 changes the interference pattern, which changes the electrical signals output from the photodetector 22. In a fiber optic hydrophone, the electrical output of the photodetector 22 is calibrated to indicate the intensity of the acoustic field.

Figure 2:
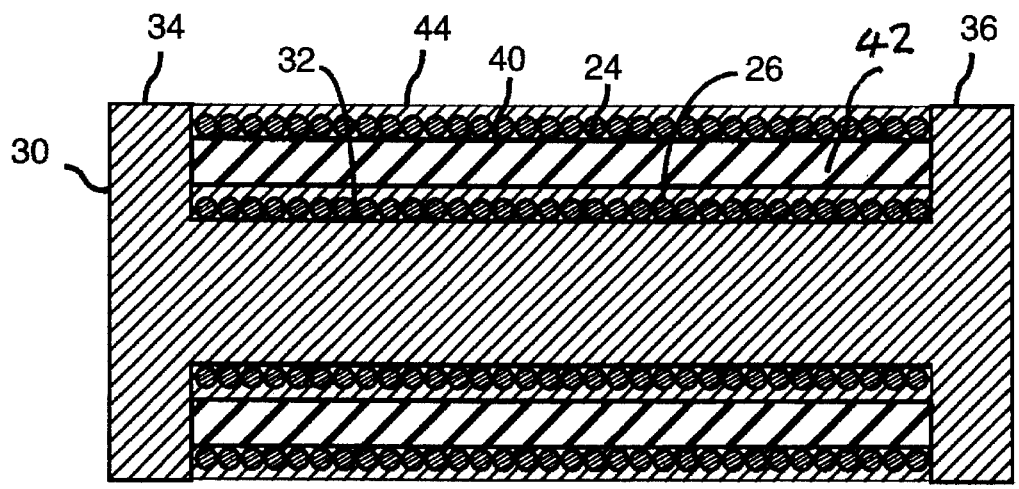
FIG. 2 illustrates a first embodiment of the invention in which sensing and reference fibers are wound on a solid mandrel.

In the present invention the sensing arm 24 and the reference arm 26 are wound on a mandrel structure. FIG. 2 illustrates a solid mandrel 30 that may be included in a fiber optic hydrophone according to the invention. It is to be understood that the sensing arm 24 and the reference arm 26 in FIG. 2 are arranged to be included in an optical interferometer as exemplified by the Mach-Zehnder interferometer of FIG. 1. The mandrel 30 preferably is formed as a solid rod 32 with end flanges 34 and 36. The reference arm 26 of the fiber optic interferometer is preferably wet wound directly on the rod 32, which may be formed of a suitable metal or other sufficiently rigid material. A potting material 40 is then applied over the reference arm 26. An elastic layer 42 formed of a material such as urethane or the like is applied over the reference arm 26. The sensing arm 24 is then wound over the elastic layer 42 and then covered with an additional elastic layer 44.

When the mandrel 30 with the sensing arm 24 and reference arm 26 secured thereto as described above is immersed in water and subjected to an acoustic field, the length of the reference arm 26 is stable because it is wound on the rigid rod 32. Changes in the acoustic field cause changes in the length of the sensing arm 24, which changes the optical path length of the sensing arm and produces an optical signal that may be processed to measure the changes in the acoustic field intensity as explained above with reference to FIG. 1.

Figure 3:
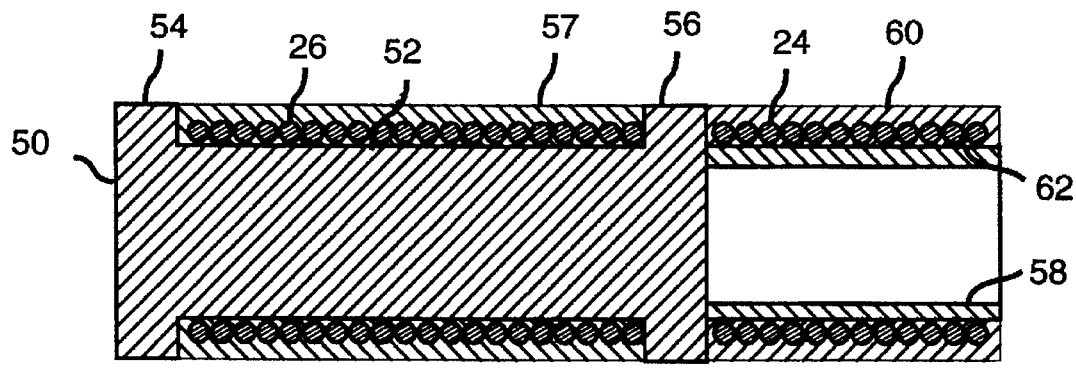
FIG. 3 illustrates a step in forming fiber optic hydrophone according to a second embodiment of the invention having a reference arm coil formed on a rigid mandrel and a sensing arm coil formed on a mandrel that is to be removed from the sensing arm coil after potting.

FIG. 3 illustrates an embodiment of the invention in which the sensing and reference arms are laterally separated so that they are not concentric as in FIG. 2. The reference arm 26 is wound and potted with a material 57 on a solid mandrel 50 that includes a rigid rod 52 that has end flanges 54 and 56. The sensing arm 24 is wound on a collapsible mandrel 58 and then potted with a material 60 such as urethane so that the sensing arm 24 retains the shape of the mandrel 58.

Figure 4:
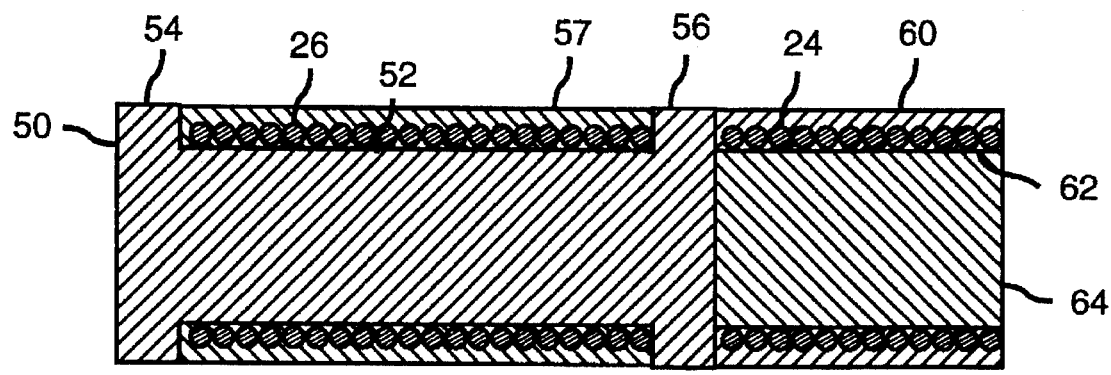
FIG. 4 illustrates a the fiber optic hydrophone formed according to the step of FIG. 3.

Referring to FIG. 4, the mandrel 58 is removed from the center of the sensing coil, which leaves a cavity 62 inside the sensing arm 24. The cavity 62 preferably is filled with urethane 64 or other similar material so that the sensing arm 24 is totally encased. Because the reference arm 26 is wound and potted on the rigid, solid mandrel 50, exposure to an acoustic field has no effect on the optical path length of the reference arm. The sensing arm 24, being encased in a flexible material such as urethane undergoes a change in optical path length in response to exposure to the acoustic field.

Figure 5:
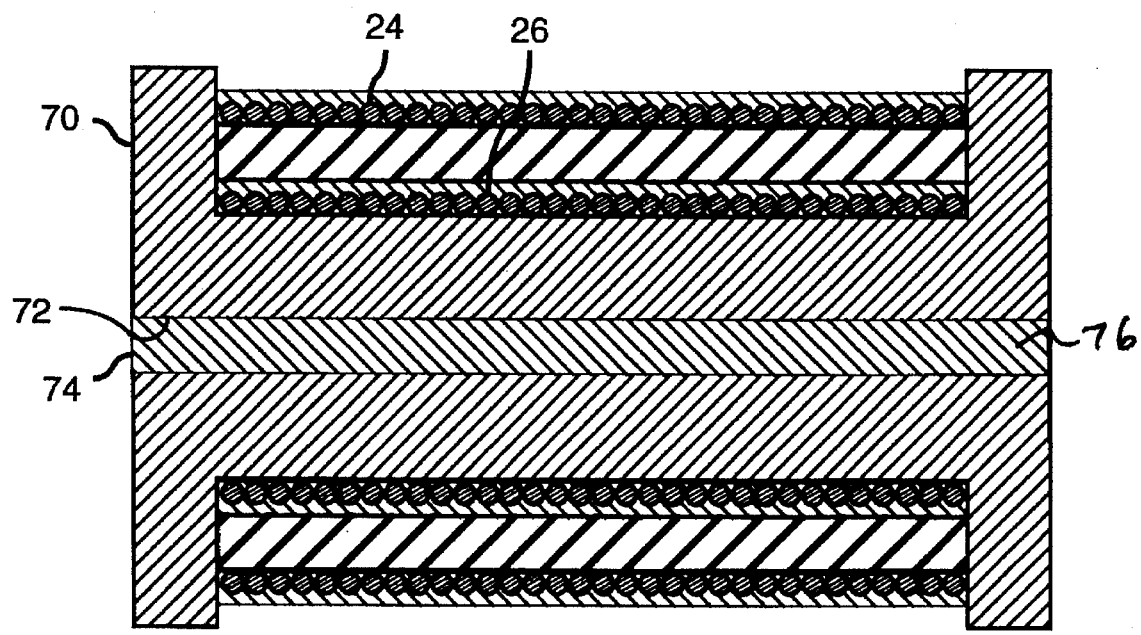
FIG. 5 illustrates a fiber optic hydrophone according to the invention formed on a hollow rigid mandrel.

FIG. 5 illustrates a thick-walled hollow mandrel 70 that may be used instead of the solid mandrel. The mandrel 70 has a central cavity 72 that may be used for storing the fiber optic couplers 16 and 20. The cylindrical wall 74 of the mandrel 70 should be sufficiently thick that it is non-compliant when submerged in water to the depth where the invention is to be used. The fiber optic couplers 16 and 20 may be stored inside the cavity 72. If the mandrel 70 is not sufficiently rigid, then it should be filled with a rigid potting material 76. This invention is particularly well suited for use in an extended, flexible, spatially weighted fiber optic interferometric hydrophone where most of the inner mandrels are solid anyway, and the fiber optic couplers are stored only within the end two mandrels or in separate housings beyond the mandrels.

The scale factor of a fiber optic hydrophone is typically expressed as the ratio of radians of interferometer output to incident acoustic pressure. At a nominal ambient pressure of about 700 psi, which corresponds to a depth of about 1500 feet, the scale factor of a fiber optic hydrophone formed in accordance with the present invention was 0.3 dB greater than the scale factor of a device of nearly identical size constructed with an air-backed mandrel designed for high pressure survivability.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. An interferometric fiber optic hydrophone, comprising:
   a rigid mandrel;
   a fiber optic interferometer having a sensing arm, a reference arm and apparatus for processing optical signals output from the fiber optic interferometer to measure acoustic pressure,
   the reference arm comprising a length of optical fiber wound around the rigid mandrel and arranged to have a substantially constant optical path length when the fiber optic hydrophone is exposed to an acoustic field;
   the sensing arm comprising a length of optical fiber formed as a coil and arranged to undergo an optical path length change when the fiber optic hydrophone is exposed to an acoustic field, and
   an elastic material placed over the reference arm and wherein the sensing arm is coil wound over the elastic material such that the sensing arm and reference arm are concentric.

2. The fiber optic hydrophone of claim 1 wherein the elastic material comprises urethane.

3. The fiber optic hydrophone of claim 1 wherein the sensing arm coil is encased in an elastic material and spaced apart from the reference arm.

\* \* \* \* \*